United States Patent
Lee et al.

(10) Patent No.: US 8,007,211 B1
(45) Date of Patent: Aug. 30, 2011

(54) APPARATUS FOR MAKING ALIGNED INCLINED HOLES IN WORK PIECES

(75) Inventors: Yu-Jyun Lee, Taichung (TW); Yu-Hao Lee, Taichung (TW)

(73) Assignee: Meeng Gane Enterprise Co., Ltd., Taichung (TW)

( * ) Notice: Subject to any disclaimer, the term of this patent is extended or adjusted under 35 U.S.C. 154(b) by 442 days.

(21) Appl. No.: 12/248,022

(22) Filed: Oct. 8, 2008

(51) Int. Cl.
*B23B 47/28* (2006.01)

(52) U.S. Cl. .................. 408/115 R; 408/241 G

(58) Field of Classification Search .......... 408/115 R, 408/72 R, 72 B, 97, 241 B, 115 B, 67; 81/44; *B23B 47/28*
See application file for complete search history.

(56) References Cited

U.S. PATENT DOCUMENTS

| | | | | |
|---|---|---|---|---|
| 1,016,383 A | * | 2/1912 | Wellman | 81/44 |
| 2,008,436 A | * | 7/1935 | Cross | 408/110 |
| 2,966,815 A | * | 1/1961 | Ramien | 408/72 R |
| 3,381,551 A | * | 5/1968 | Lavering et al. | 408/72 R |
| 3,661,469 A | * | 5/1972 | Leff et al. | 408/72 R |
| D264,930 S | * | 6/1982 | Lindsay | D8/70 |
| D268,165 S | * | 3/1983 | Perry et al. | D8/70 |
| 7,131,796 B2 | * | 11/2006 | Rooney | 408/115 R |
| 7,153,070 B1 | * | 12/2006 | Schroeder | 408/115 R |

FOREIGN PATENT DOCUMENTS

| | | | |
|---|---|---|---|
| DE | 10231252 A1 | * | 1/2004 |
| EP | 1595627 A2 | * | 11/2005 |
| GB | 661420 A | * | 11/1951 |
| WO | WO 0074884 A1 | * | 12/2000 |

* cited by examiner

*Primary Examiner* — Daniel Howell

(57) ABSTRACT

An apparatus is disclosed for making aligned inclined holes in upper and lower work piece. The apparatus includes a set of drill bits and an alignment element. Each of the drill bits can be driven into the upper and lower work pieces to make the inclined holes. The alignment element includes a horizontal plate, a vertical plate extended from the horizontal plate and a tube extended from a corner formed between the horizontal and vertical plates. The horizontal plate is used for contact with the upper work piece. The vertical plate is used for contact with the lower work piece. The tube includes a tunnel for receiving a selected one of the drill bits, a space for receiving debris produced because of the drilling and an aperture through which the selected drill bit is inserted into the space from the tunnel.

3 Claims, 5 Drawing Sheets

APPARATUS FOR MAKING ALIGNED INCLINED HOLES IN WORK PIECES

FIELD OF INVENTION

The present invention relates to an apparatus for making aligned inclined holes in work pieces.

BACKGROUND OF INVENTION

Apparatuses for making inclined holes in two work pieces can be found in Taiwanese Patent Publication Nos. 00222088 and 00230409 for example. Such an apparatus includes a clamping device and a drill bit. The clamping device includes two jaws, a datum block, two guiding rods, a screw and two sleeves. The jaws are parallel to each other. The datum block is located between the jaws. The guiding rods and the screw are inserted through the jaws and the datum block. The drill bit can be inserted through each of the sleeves to drill an inclined hole in each of the work pieces. There are however problems. Clamping devices of various sizes are needed for work pieces of various sizes, and this is an expensive practice. The work pieces are clamped with the clamping device independent of each other so that the holes are made in the work pieces independent of each other. When the work pieces are against each other, the holes may not be aligned to each other so that a screw cannot be driven into the holes.

A simple apparatus for making inclined holes in two work pieces is disclosed in Taiwanese Patent M297278 for example. Such a simple apparatus includes a sleeve and a drill bit. The sleeve includes a lower end located on the substrate. The drill bit is inserted through the sleeve to make a hole in the slat and a corresponding hole in the substrate. Then, a screw is driven in the hole in the substrate through the hole in the slat. Since the area of the contact of the sleeve with the substrate is small, it is difficult to precisely position the sleeve and the slat relative to the substrate while operating the drill bit.

The present invention is therefore intended to obviate or at least alleviate the problems encountered in prior art.

SUMMARY OF INVENTION

It is the primary objective of the present invention to provide a simple apparatus for making aligned inclined holes in upper and lower work pieces.

To achieve the foregoing objective, the apparatus includes a set of drill bits and an alignment element. Each of the drill bits can be driven into the upper and lower work pieces to make the inclined holes. The alignment element includes a horizontal plate, a vertical plate extended from the horizontal plate and a tube extended from a corner formed between the horizontal and vertical plates. The horizontal plate is used for contact with the upper work piece. The vertical plate is used for contact with the lower work piece. The tube includes a tunnel for receiving a selected one of the drill bits, a space for receiving debris produced because of the drilling and an aperture through which the selected drill bit is inserted into the space from the tunnel.

Other objectives, advantages and features of the present invention will become apparent from the following description referring to the attached drawings.

BRIEF DESCRIPTION OF DRAWINGS

The present invention will be described via the detailed illustration of the preferred embodiment referring to the drawings.

DETAILED DESCRIPTION OF PREFERRED EMBODIMENT

Figure 2:
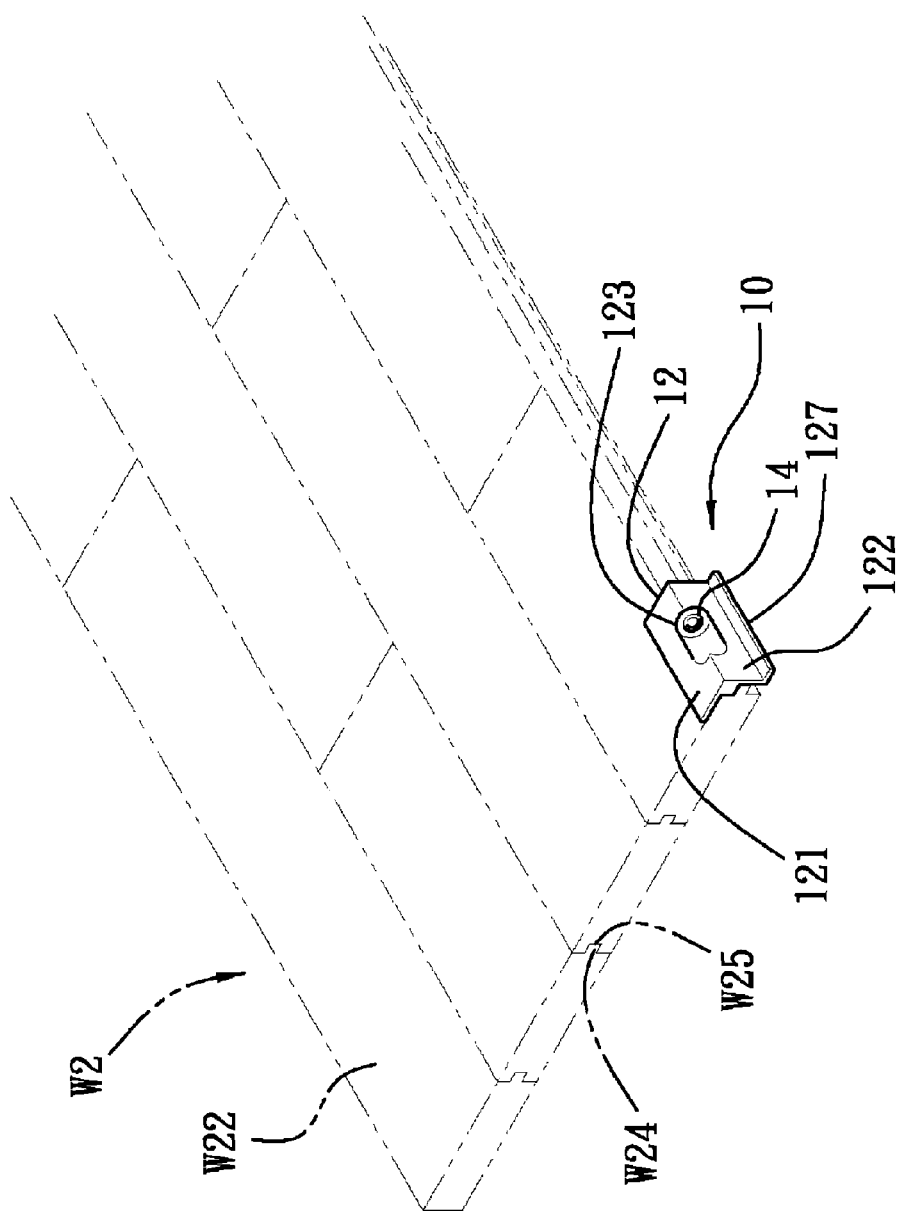
FIG. 2 is an exploded view of slats processed with the apparatus shown in FIG. 1.
Figure 3:
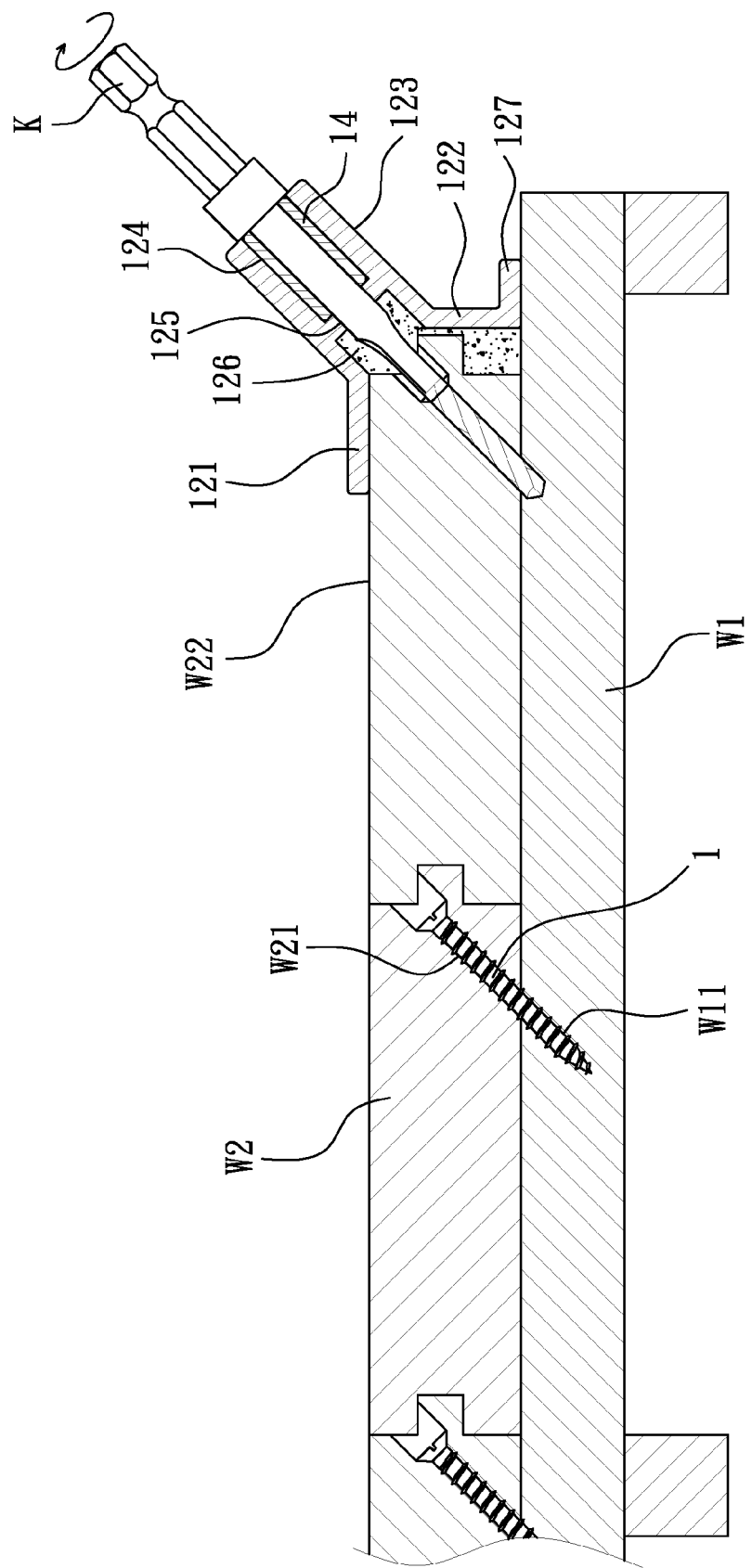
FIG. 3 is a cross-sectional view of a substrate and the slats and the apparatus shown in FIG. 2.

Referring to FIGS. 2 and 3, a work piece W1 and work pieces W2 are shown. The work piece W1 is a plain substrate of wood paved on a floor of concrete for example. The work pieces W2 are aesthetically pleasing decorative slats of wood paved on the substrate. Each of the decorative slats W2 includes an aesthetically pleasing upper face W22, a groove W25 defined in an edge and a ridge W24 formed on an opposite edge. The ridge W24 of a decorative slat W2 is disposed in the groove W25 of a previous decorative slat W2.

Figure 1:
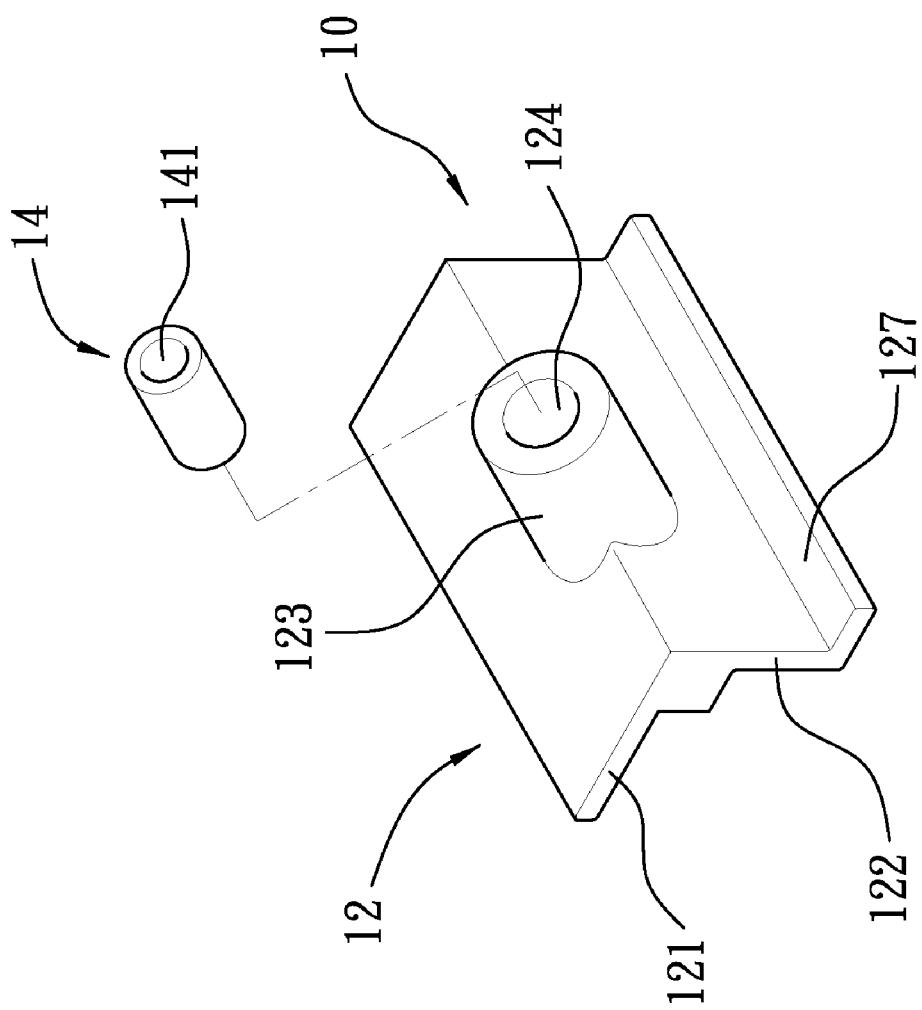
FIG. 1 is a perspective view of an apparatus making aligned inclined holes in work pieces according to the preferred embodiment of the present invention.

Referring to FIGS. 1 through 3, there is shown an apparatus for making an inclined hole in a decorative slat W2 and an inclined hole in the substrate W1 so that the inclined holes are aligned with each other. Thus, the decorative slat W2 will be attached to the substrate W1 and abutted against a previous decorative slat W1 when a screw is driven in the inclined hole in the substrate W1 through the inclined hole in the decorative slat W2.

The apparatus includes an alignment element 10, a set of sleeves 14 (only one is shown) and a set of drill bits K (only one is shown). The alignment element 10 includes a first horizontal plate 121, a second horizontal plate 127, a vertical plate 122 formed between the first horizontal plate 121 and the second horizontal plate 127 and a tube 123 extended from a corner formed between the first horizontal plate 121 and the vertical plate 122. The tube 123 includes a tunnel 124 defined therein, a space 126 defined therein and an aperture 125 through which the tunnel 124 is connected to the space 126. The diameter of the aperture 125 is smaller than that of the tunnel 124 that is smaller than that of the space 126.

Each of the sleeves 14 includes a tunnel 141 defined therein. Each of the sleeves 14 can be disposed in the tunnel 124 of the tube 123 of the alignment element 10.

Each of the drill bits K can be inserted through the tunnel 141 defined in a related one of the sleeves 14. Thus, each of the drill bits K can be smoothly rotated and precisely directed in the tunnel 141 of a related one of the sleeves 14.

Figure 4:
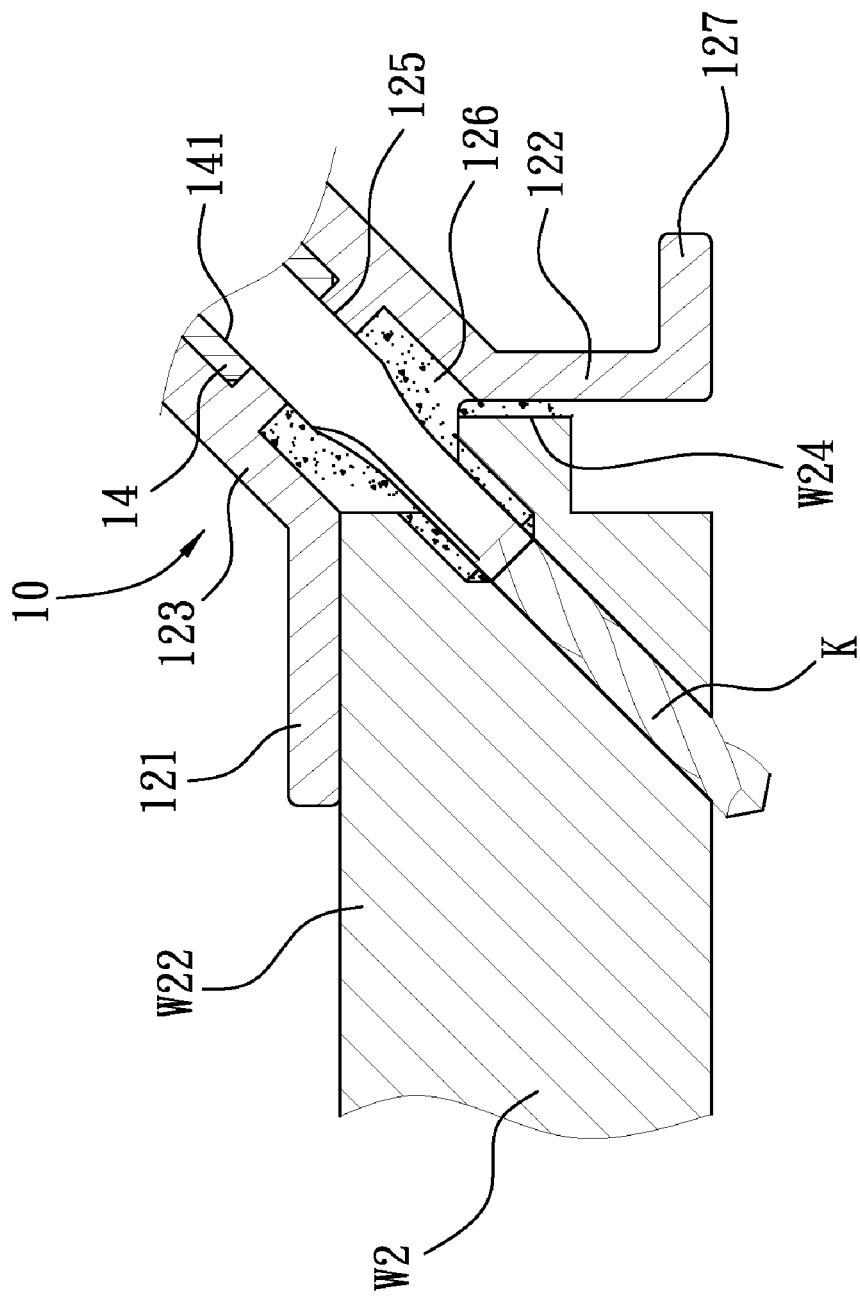
FIG. 4 is an enlarged partial view of the substrate, the slat and the apparatus shown in FIG. 3.

Referring to FIGS. 3 and 4, the first horizontal plate 121 of the alignment element 10 is located on a decorative slat W2 while the second horizontal plate 127 of the same is located on the substrate W1 so that the alignment element 10 is firmly positioned. The vertical plate 122 of the alignment element 10 may or may not be located against the ridge W24 of the decorative slat W2. The drill bit K is inserted through the sleeve 14 and driven in the decorative slat W2 and the substrate W1. Debris that is generated because of the drilling is transferred into the space 126 so that the debris does not interfere with the drilling.

Figure 5:
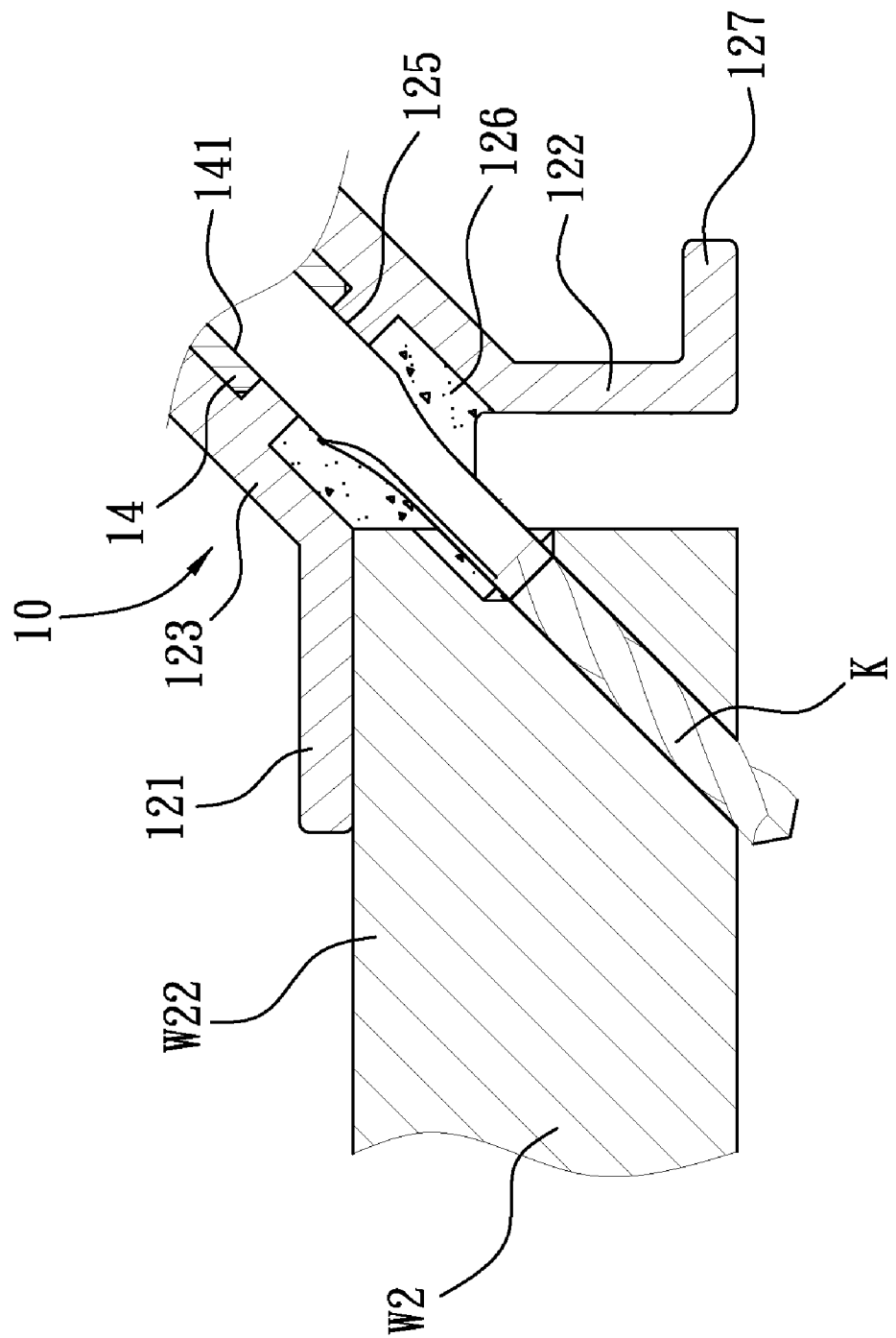
FIG. 5 is an enlarged partial view of a substrate, a slat and the substrate and apparatus shown in FIG. 1.

Referring to FIG. 5, the first horizontal plate 121 of the alignment element 10 is located on a decorative slat W2 as part of an edge of the array of the decorative slats W2. The second horizontal plate 127 of the same is located on the substrate W1. The vertical plate 122 of the alignment element 10 is not located against the ridge W24 of the decorative slat W2.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. An apparatus for making aligned inclined holes in upper and lower work pieces, the apparatus comprising:
    a set of drill bits so that each of the drill bits can be driven into the upper and lower work pieces to make the inclined holes; and
    an alignment element comprising:
        a first horizontal plate for contact with the upper work piece;
        a second horizontal plate for contact with the lower work piece;
        a vertical plate extended from the first horizontal plate to the second horizontal plate; and
        a tube extended from a corner formed between the first horizontal plate and the vertical plate and formed with a tunnel for receiving a selected one of the drill bits, a space for receiving debris produced because of the drilling and an aperture through which the selected drill bit is inserted into the space from the tunnel.

2. The apparatus according to claim 1, wherein the diameter of the aperture is smaller than the diameter of the space and the diameter of the tunnel.

3. The apparatus according to claim 1 comprising a set of sleeves so that each of the sleeves can be provided between the tube and a related one of the drill bits.

* * * * *